United States Patent [19]

Farfaglia

[11] 4,295,903
[45] Oct. 20, 1981

[54] CONTAINER SPINNING APPARATUS FOR CONTAINER MANUFACTURING MACHINE OR THE LIKE

[75] Inventor: Silvio T. Farfaglia, Fulton, N.Y.

[73] Assignee: Phillips Petroleum Company, Bartlesville, Okla.

[21] Appl. No.: 39,929

[22] Filed: May 17, 1979

[51] Int. Cl.³ .......................... B65B 7/28; B05B 13/02
[52] U.S. Cl. ..................................... 156/69; 118/318; 118/319; 118/320; 118/503; 156/293; 156/567; 156/575; 198/479; 198/480; 427/231; 427/234; 427/284; 493/108; 493/128
[58] Field of Search ................ 93/36.5 R, 462, 468; 101/40; 118/318, 319, 320, 503; 198/479, 480, 803; 156/69, 567, 575, DIG. 26, 293; 427/231, 234, 284; 493/108, 128, 150

[56] References Cited

U.S. PATENT DOCUMENTS

| | | | |
|---|---|---|---|
| 2,277,128 | 3/1942 | Miller | 93/36.5 |
| 2,545,912 | 3/1951 | Baumgartner et al. | 93/36.5 |
| 2,608,914 | 9/1952 | Merkle | 93/36.5 |
| 3,053,221 | 9/1962 | Heffley | 118/318 X |
| 3,313,409 | 4/1967 | Johnson | 209/525 |
| 3,358,808 | 12/1967 | Reynolds | 198/33 |
| 3,468,225 | 9/1969 | Pesch et al. | 93/36.5 |
| 3,521,598 | 7/1970 | Straw | 118/318 X |
| 4,124,112 | 11/1978 | Mohney et al. | 198/344 |

Primary Examiner—Robert A. Dawson

[57] ABSTRACT

An improved apparatus for clamping and rotating containers which includes a rotatably supported table for supporting and rotating a container about an axis, drive means connected to the table for rotating the table about the axis of rotation, a plurality of jaws movably mounted on the table for alternately engaging and releasing a container to be rotated, jaw-positioning means engageable with the plurality of jaws for moving the jaws into and out of engagement with a container, and actuator means for actuating the jaw-positioning means. A method of applying sealant to the inside of a container at the juncture between the inner surfaces of the bottom closure member and the sidewall thereof is also disclosed.

19 Claims, 8 Drawing Figures

CONTAINER SPINNING APPARATUS FOR CONTAINER MANUFACTURING MACHINE OR THE LIKE

This invention relates generally to the manufacture of containers. In one aspect the invention relates to apparatus for grasping and spinning a container during a container manufacturing process. In another aspect the invention relates to a method of grasping and spinning a container during a container manufacturing process.

In the manufacture of containers, and more particularly in the manufacture of containers made from paperboard material, sealing of the seams between, for example, the bottom closure member and the side wall, is often not completely effected when the side wall and bottom closure member are joined together. In order to overcome this problem, it has been a common practice in the art to apply sealant to the container seams to effect sealing. A typical method of applying sealant involves retaining a container in a pocket or recess and rotating the container while directing a stream of sealant from a dispensing nozzle to the juncture between the bottom closure member and the side wall. Rotation of the container allows the sealant to be dispensed entirely around the periphery of the bottom member, and the centrifugal force due to rotation of the container assists in smoothing out the applied sealant. However, such prior art apparatus has necessitated the utilization of complicated mechanisms to insert and remove each container into and from the pocket or recess, or else each container must be inserted and/or removed by hand which is time consuming and costly.

The use of a rotating platform upon which a container is rotated avoids the necessity for employing complicated feed mechanisms for positioning containers on the container rotating apparatus. However, if a rotating platform is employed, retaining a container on the rotating platform for rotation thereon can pose problems, particularly since the container is usually rotated at high speeds to effect sufficient centrifugal forces to smooth out the sealant. Rotation of each container should be accomplished without moving the container out of position for rotation generally about its longitudinal axis or throwing the container from the apparatus due to the high rotational speed. Rotational speeds of 1000 r.p.m. or more are common during the application of sealant. It would therefore be advantageous to provide an apparatus which can receive a container in a simple manner and can effectively hold the container in position on a rotating platform for the dispensing of sealant particularly into the seam between the bottom closure member and the side wall.

It is, therefore, an object of the present invention to provide method and apparatus which is effective for receiving and rotating a container in a container-manufacturing machine. It is another object of the present invention to provide apparatus for receiving, grasping and spinning a container to facilitate the application of sealant thereto. Another object of the invention resides in the provision of apparatus for rotating a container which is simple in construction. Still another object of the invention resides in the provision of apparatus for spinning a container which is economical to manufacture, reliable in operation, simple to operate, easily maintained and well adapted for its intended use.

The present invention contemplates apparatus for clamping and rotating containers comprising a support; table means rotatably positioned on said support for supporting a container for rotation about an axis; means on said support for mounting said table means on said support whereby said table means is free to rotate about an axis of rotation; drive means operatively connected to said table means for rotating said table means about said axis of rotation; a plurality of jaw means each movably mounted on said table means for moving between a first position wherein said jaw means are retracted out of engagement with the container, and a second position wherein said jaw means are actuated into engagement with the container; jaw-positioning means engageable with said plurality of jaw means and adapted for reciprocal movement coaxial with said axis of rotation of said table means for positioning said plurality of jaw means in the first positions thereof in a first position of said jaw-positioning means and, alternately, for positioning said plurality of jaw means in the second positions thereof in a second position of said jaw-positioning means; and actuator means operatively related to said jaw-positioning means for actuating said jaw-positioning means into said first position thereof and, alternately, actuating said jaw-positioning means into said second position thereof.

Other aspects, objects and advantages of the present invention will be readily apparent from the following detailed description and claims in conjunction with the drawings in which:

Referring now to the drawings and to FIGS. 1-5 in particular, a paperboard container manufacturing machine, constructed in accordance with the present invention, is illustrated therein and is generally designated by the reference character 10. The machine 10 comprises a support frame 12 comprising a plurality of supporting legs 14, a control panel 16 and a substantially horizontal container-supporting table 18.

Figure 1:
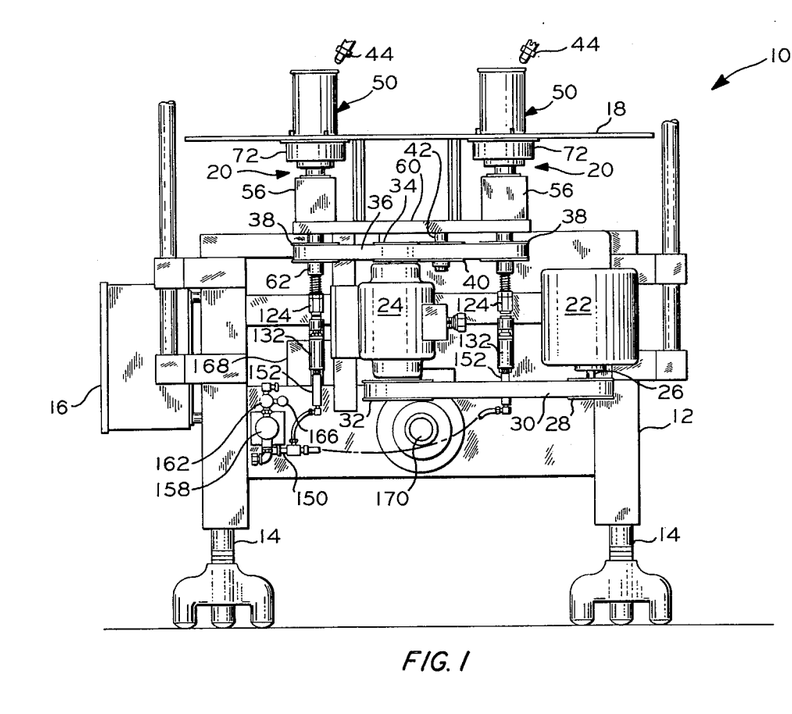
FIG. 1 is a side elevation view of a paperboard container manufacturing machine equipped with container spinning stations constructed in accordance with the present invention.

The machine 10 further includes a pair of container spinning station assemblies 20 mounted on the support frame 12. A spinning station drive motor 22 and a spinning station brake clutch 24 are also mounted on the support frame 12. The output shaft 26 of the drive motor 22 is provided with a drive belt pulley 28 which is drivingly connected to the brake clutch 24 via a flexible drive belt 30 and an input pulley 32 connected to the input drive shaft of the brake clutch 24. The brake clutch 24 is provided with an output pulley 34 connected to the output shaft of the brake clutch, and the output pulley 34 is drivingly connected to the spinning station assemblies 20 via a flexible drive belt 36 and the respective input pulleys 38 of the spinning station assemblies 20. Tension on the drive belt 36 is maintained by a tension idler pulley 40 engaging the belt 36 and journaled on a tension idler shaft 42 mounted on the support frame 12. The flexible drive belts 30 and 36 are preferably grooved timing belts which meshingly engage corresponding grooved surfaces in the pulleys 28, 32, 34, 38 and 40.

Figure 3:
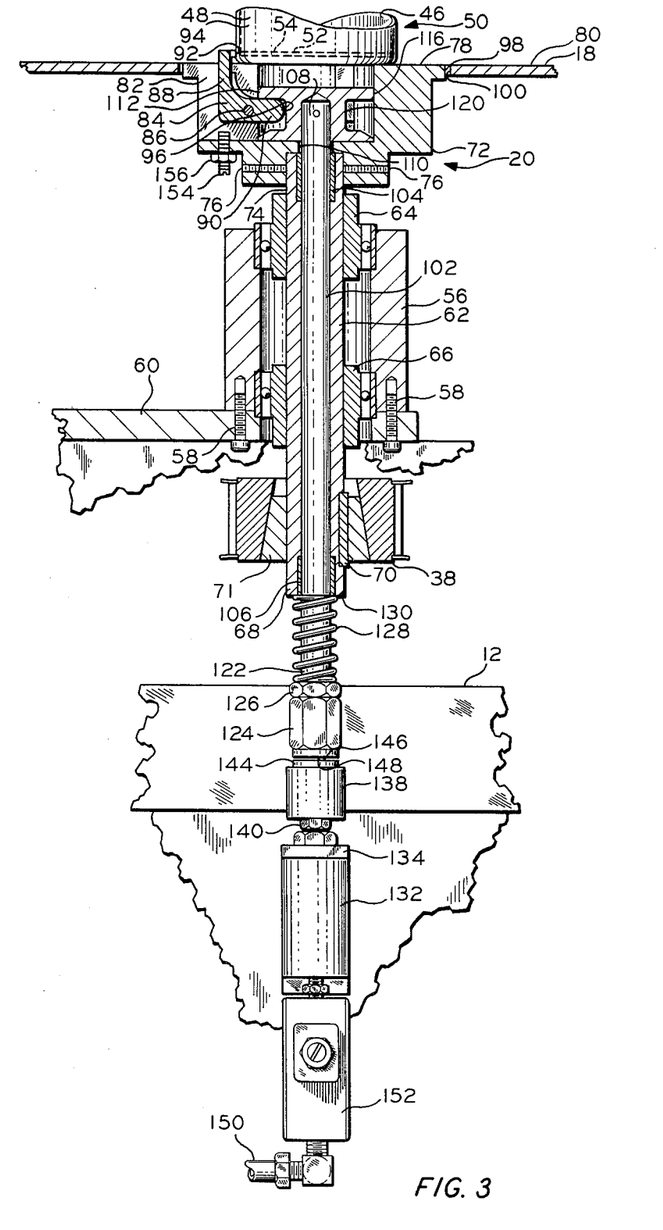
FIG. 3 is an enlarged partial vertical cross-section view of the container spinning station of FIG. 2 illustrating the container-engaging jaw members in the container-engaging position.

The machine 10 is further provided with a plurality of sealant nozzles 44 each mounted on the support frame 12 by suitable means (not shown) in a position proximate to a corresponding spinning station assembly 20. Each nozzle 44 is positioned so as to direct a stream of sealant emanating therefrom to the juncture between the inner surface 46 of the side wall 48 of a paperboard container 50 and the inner surface 52 of the bottom closure member 54 of the container 50, as best shown in FIGS. 1 and 3.

Figure 2:
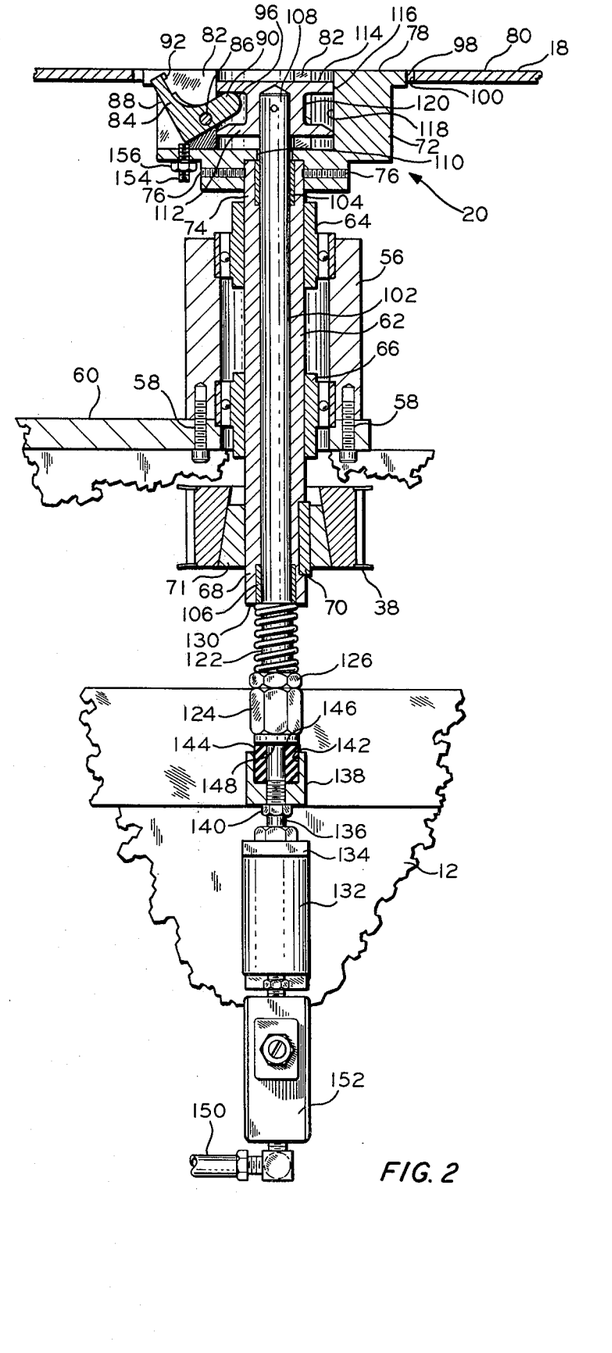
FIG. 2 is an enlarged partial vertical cross-section view of a container spinning station constructed in accordance with the present invention illustrating the container-engaging jaw members in the retracted position.

Each of the spinning station assemblies 20 comprises a bearing block 56 secured by threaded bolts 58 to a horizontally extending bracket plate 60 mounted on the support frame 12. A vertically oriented, tubular drive shaft 62 is journaled in the bearing block 56 by means of ball bearings 64 and 66. The respective input pulley 38 is drivingly secured to the lower end portion 68 of the drive shaft 62 by means of a key 70 and a taper lock bushing 71.

Figure 4:
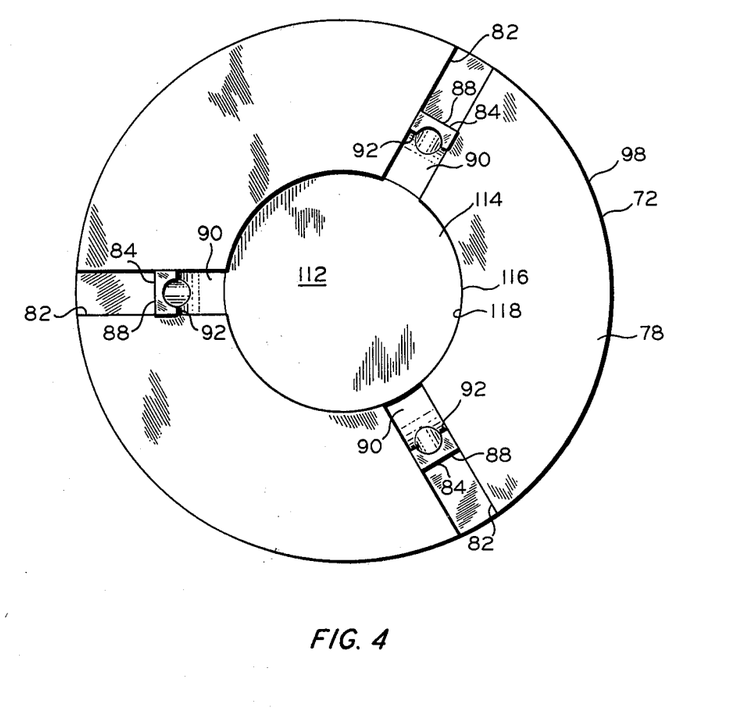
FIG. 4 is an enlarged top plan view of the container spinning station of FIG. 3.

A rotary table 72 is fixedly secured to the upper end portion 74 of the drive shaft 62 by means of a pair of oppositely disposed threaded set screws 76. The rotary table 72 is provided with a substantially flat upper surface 78 which is aligned substantially perpendicular to the rotational axis of the drive shaft 62. The upper surface 78 is substantially coplanar with the upper surface 80 of the container-supporting table 18. The rotary table 72 is provided with three grooves 82 each of which extends radially outwardly from the axis of rotation of the rotary table 72 and drive shaft 62 and intercepts the upper surface 78. The grooves 82 are equally angularly spaced about the axis of rotation of the rotary table 72.

The rotary table 72 is provided with jaw means for engaging a container 50 in the form of three jaw members 84 each pivotally secured within a respective groove 82 by means of a pivot pin 86. Each jaw member 84 is substantially L-shaped and comprises a generally upwardly extending leg portion 88 and a generally radially inwardly extending leg portion 90 extending toward the axis of rotation of the table 72. The upwardly extending leg portion 88 is provided with a generally radially inwardly directed container-engaging face 92 for contacting the outer surface 94 of the side wall 48 to secure the container 50 on the upper surface 78 of the rotary table 72, as best shown in FIG. 3. The inner end portion 96 of the inwardly extending leg portion 90 of each jaw member 84 is preferably provided with a smoothly rounded surface. The rotary table 72 is provided with a circular outer margin 98 which is received within a corresponding circular aperture 100 in the container-supporting table 18.

Each spinning station assembly 20 is further provided with a jaw-positioning shaft 102 disposed within and coaxially aligned with the tubular drive shaft 62. The shaft 102 is mounted for sliding movement within the drive shaft 62 by means of bushings 104 and 106. The upper end portion 108 of the shaft 102 extends through an aperture 110 in the rotary table 72. A jaw member-actuating cam 112 is fixedly secured to the upper end portion 108 of the shaft 102. The cam 112 is provided with a substantially flat upper surface 114 and a substantially cylindrically shaped side surface 116. The cam 112 is received within a generally cylindrical cavity 118 in the upper portion of the rotary table 72. The cam 112 is additionally provided with a circumferential groove 120 in which the inner end portion 96 of each of the jaw members 84 is received.

The lower end portion 122 of the shaft 102 extends downwardly beyond the lower end portion 68 of the drive shaft 62. An adjusting nut 124 and a jam nut 126 are each threadedly secured to the lower end portion 122 of the shaft 102. A compression coil spring 128 is positioned around the lower end portion 122 of the shaft 102 and extends between the jam nut 126 and the lower end face 130 of the drive shaft 62. The coil spring 128 provides bias means for normally yieldably urging the jaw-positioning shaft 102 downwardly relative to the drive shaft 62, which normally positions the jaw member-actuating cam 112 in its lowermost position relative to the rotary table 72 thereby urging the radially inwardly extending leg portions 90 of each of the jaw members 84 downwardly and rotating the jaw members 84 about their respective pivot pins 86 so that the container-engaging faces 92 thereof engage the outer surface 94 of the container 50, as shown in FIG. 3. When the bias of the coil spring 128 is overcome and the jaw-positioning shaft 102 is moved upwardly relative to the drive shaft 62, the jaw member-actuating cam 112 is moved upwardly to an elevated position within the rotary table 72, thereby moving the radially inwardly extending leg portions 90 of each of the jaw members 84 upwardly and pivoting the jaw members 84 about their respective pivot pins 86 so that the upwardly extending leg portions 88 of the jaw members 84 are fully retracted below the upper surface 78 of the rotary table 72, as illustrated in FIG. 2.

Each spinning station 20 is further provided with a suitable power cylinder 132, preferably an air cylinder, mounted on the support frame 12 by means of a suitable bracket 134. Each air cylinder is preferably positioned with the piston rod 136 thereof extending upwardly and in generally coaxial alignment with the jaw-positioning shaft 102 of the respective spinning station assembly 20. The piston rod 136 is threadedly secured to a spring retainer 138 and is locked thereto by a jam nut 140 also threadedly secured to the piston rod 136. The spring retainer 138 is provided with a generally cylindrical cavity 142 in the upper end portion thereof in which the generally cylindrically shaped elastomeric spring 144 is received. When the cylinder 132 is extended, as illustrated in FIG. 2, the upper end face 146 of the spring 144 abuttingly engages the lower end face 148 of the adjusting nut 124. The resilient spring 144 serves to absorb any excessive impact shock which might be generated by the contact between the spring 144 and the nut 124 upon extension of the cylinder 132. Pressurized fluid, preferably pressurized air, is provided from a line 150 to the piston end of the power cylinder 132 via a suitable speed control valve 152. Many valves suitable for this purpose are commercially available. One such adjustable valve for use with an air cylinder is sold by Parker Hannifin Corp., Cleveland, Ohio and is designated by the Model No. S-25. The power cylinder 132 is preferably a one-way air cylinder which is biased into the retracted position by an integral spring. The speed control valve 152 permits the manual adjustment of the speed at which the cylinder 132 extends the piston rod 136 upon the application of pressurized fluid to the piston end thereof. When the cylinder 132 is biased to the retracted position, as shown in FIG. 3, there is preferably a small clearance of about 0.125 inch (3.2 mm.) between the upper end face 146 of the spring 144 and the lower end face 148 of the adjusting nut 124 so that the jaw members 84 fully engage the container 50 under the urging of the coil spring 128.

Each rotary table 72 is preferably provided with three threaded adjusting screws 154 positioned respectively below each of the jaw members 84 to provide means for adjustably limiting the maximum rotation of the jaw members into the retracted position. The adjusting screws are preferably secured in the desired position in the rotary table by means of jam nuts 156 respectively threadedly secured to the adjusting screws.

Figure 5:
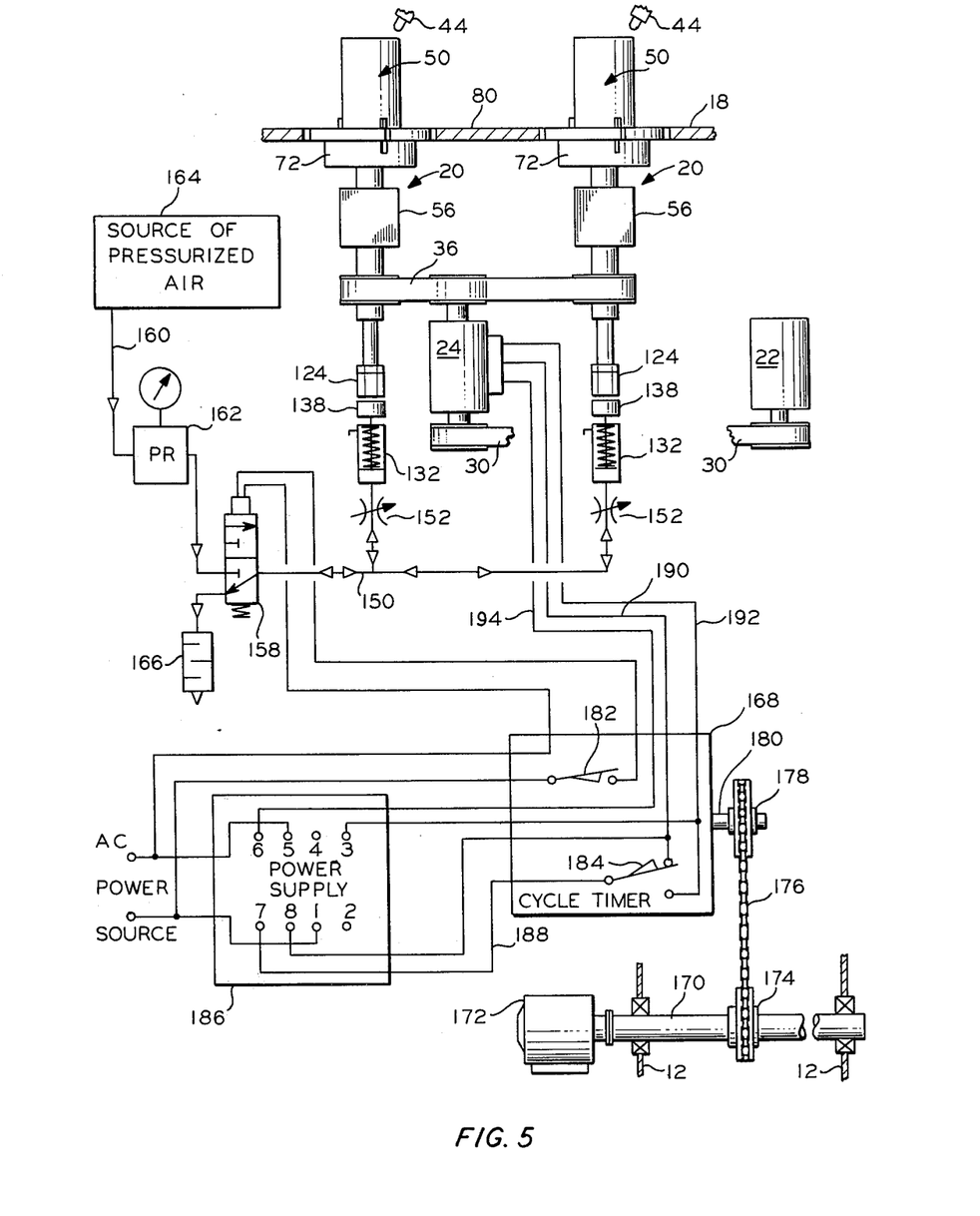
FIG. 5 is a schematic diagram of the control system for the container spinning stations of FIG. 1.

The line 150 is connected to the outlet port of a three-way, normally closed solenoid valve 158. The inlet port of the valve 158 is connected, via conduit 160 and a suitable pressure regulator 162 interposed therein, to a source of pressurized fluid 164, preferably a source of pressurized air. The exhaust port of the valve 158 is vented to the atmosphere via a silencer 166.

A cycle timer 168 is mounted on the support frame 12 and provides means for controlling the sequence of extending and retracting the jaw members of the spinning station assemblies 20 and the commencement and cessation of rotation of the spinning station assemblies. The cycle timer 168 is preferably driven by the main shaft 170 of the machine 10, which shaft is journaled on the support frame 12 and which is driven by the primary machine drive motor 172. A drive sprocket 174 drivingly secured to the shaft 170 is connected by a suitable drive chain 176 to a driven sprocket 178 which is drivingly secured to the power input shaft 180 of the cycle timer 168, as schematically illustrated in FIG. 5. The cycle timer 168 is preferably in the form of a rotating cam limit switch device comprising two cam-operated switches 182 and 184 actuated by respective cams driven by the power input shaft 180.

Cam operated switch 182 controls the application of an AC actuation voltage from a suitable AC power source to the solenoid valve 158. A brake clutch power supply 186 provides a suitable DC voltage output from a suitable AC power source input to the cam-operated switch 184 via conduit 188. The cam operated switch 184 alternatively provides this DC voltage to the brake input of the brake clutch 24 via conduit 190 and to the clutch input of the brake clutch 24 via conduit 192. Conduit 194 provides an electrical return path to the power supply 186 via the cycle timer 168.

A suitable unit for use as the brake clutch 24 is available from Stearns Electric Company, Milwaukee, Wisconsin, and is designated as Style 5CB. A suitable power supply for use as the brake clutch power supply 186 is available from Warner Electric Company, Beloit, Wisconsin, and is designated by the Model No. MCS-801. A suitable rotating cam limit switch for use as the cycle timer 168 is available from Gemco Electric Company, Clauson, Michigan, and is designated by the Model No. 1980.

At the beginning of each cycle of operation of the spinning station assemblies 20, the cam-operated switch 182 is in the closed position actuating the normally closed solenoid valve 158 to the open position, thereby extending the power cylinders 132 and retracting the jaw members 84 of the spinning station assemblies 20. The cam-operated switch 184 is in the position illustrated in FIG. 5 applying current through conduit 190 to the brake of the brake clutch 24. As the main shaft continues rotation, a container 50 is positioned by suitable conveyor means, not shown, in the center of each rotary table 72 and the cycle timer 168 is correspondingly rotated thereby opening cam-operated switch 182, causing the deactivation of the solenoid valve 158 and the retraction of the power cylinders 132 resulting in the engagement of a respective container 50 of the jaw members 84 in each of the spinning station assemblies 20. Further rotation of the cycle timer 168 actuates the cam-operated switch 184 to its second position thereby deactivating the brake and activating the clutch of the brake clutch 24 by applying current through the conduit 192. The activation of the clutch of the brake clutch 24 applies power therethrough from the constantly rotating drive motor 22 and flexible drive belts 30 and 36 to rotate the rotary tables 72 of the spinning station assemblies 20, thereby spinning the containers 50 grasped by the jaw members 84. During this spinning of the containers 50, a suitable sealant is ejected from the sealant nozzles 44 into the containers to effect a seal between the side wall 48 and bottom closure member 54 of the container 50. Sealant is ejected from the nozzles 44 for a period of time sufficient to permit the container 50 to be rotated at least 360°. The rotational speed of the rotary tables can be any speed which provides satisfactory distribution and smoothing of the sealant in the container, but in general a rotational speed of about 1,000 r.p.m. is deemed satisfactory. The sealant ejection is then automatically stopped by suitable means, not shown, at the end of this period of time. The cycle timer 168, after cessation of sealant ejection, actuates the cam-operated switch 184 back to the initial brake-actuating position while simultaneously deactivating the clutch of the brake clutch 24, thus causing a rapid cessation of rotation of the rotary table 72 of the spinning station assemblies 20. The cycle timer 168 provides sufficient time with the clutch of the brake clutch 24 activated to assure that each rotary table rotates at least 360° during each cycle of operation of the spinning station assemblies 20. Cycle timer 168 then actuates the cam-operated switch 182 to the closed position thereby activating the solenoid valve 158 and causing the extension of the power cylinders 132 with the resulting release of the containers 50 of the jaw members 84 of the spinning station assemblies 20. The containers are then conveyed away by suitable means, not shown, and new containers are positioned on the rotary table 72 and the previously described cycle is repeated.

Figure 6:
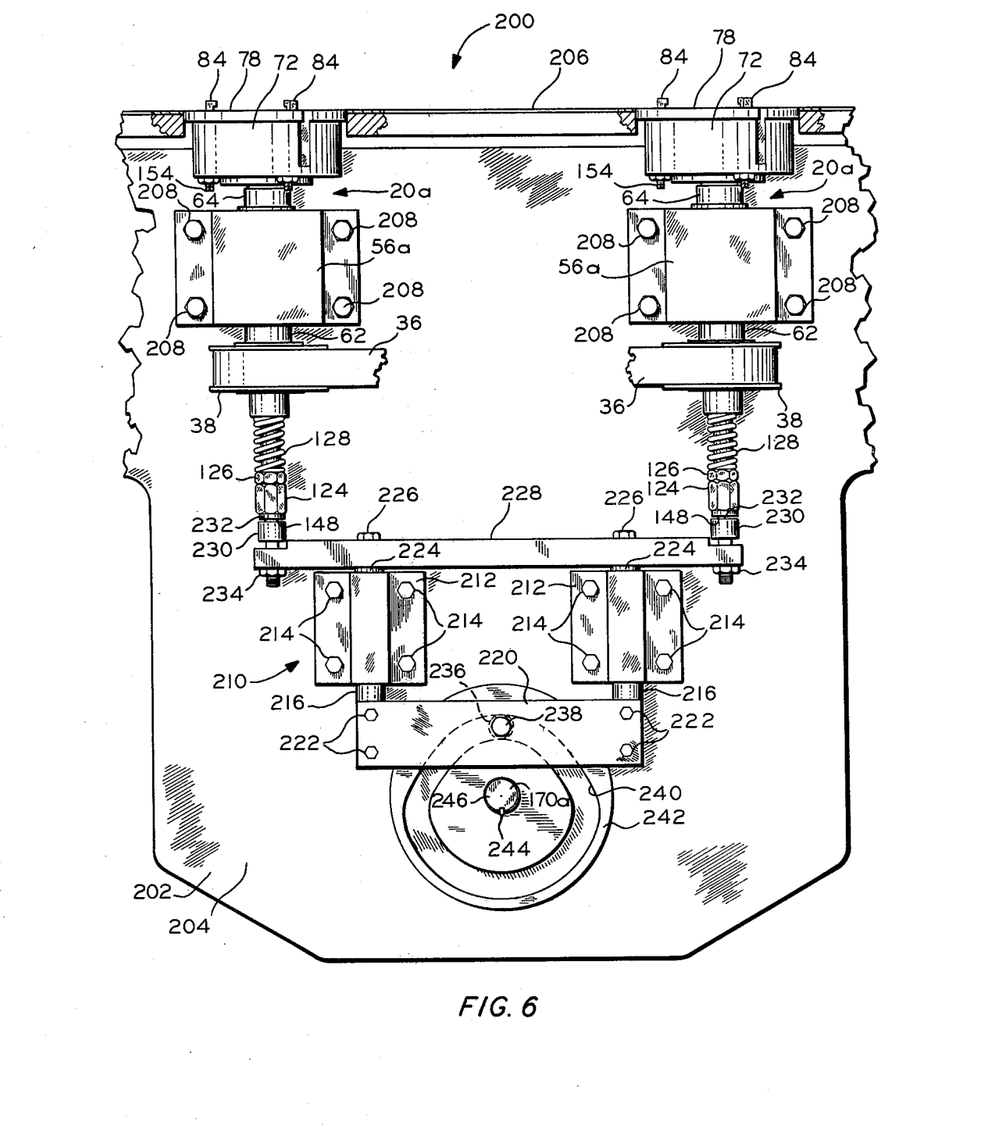
FIG. 6 is a partial side elevation view of an alternate form of paperboard container manufacturing machine equipped with container spinning stations constructed in accordance with the present invention illustrating the container-engaging jaw members in the container engaging position.
Figure 7:
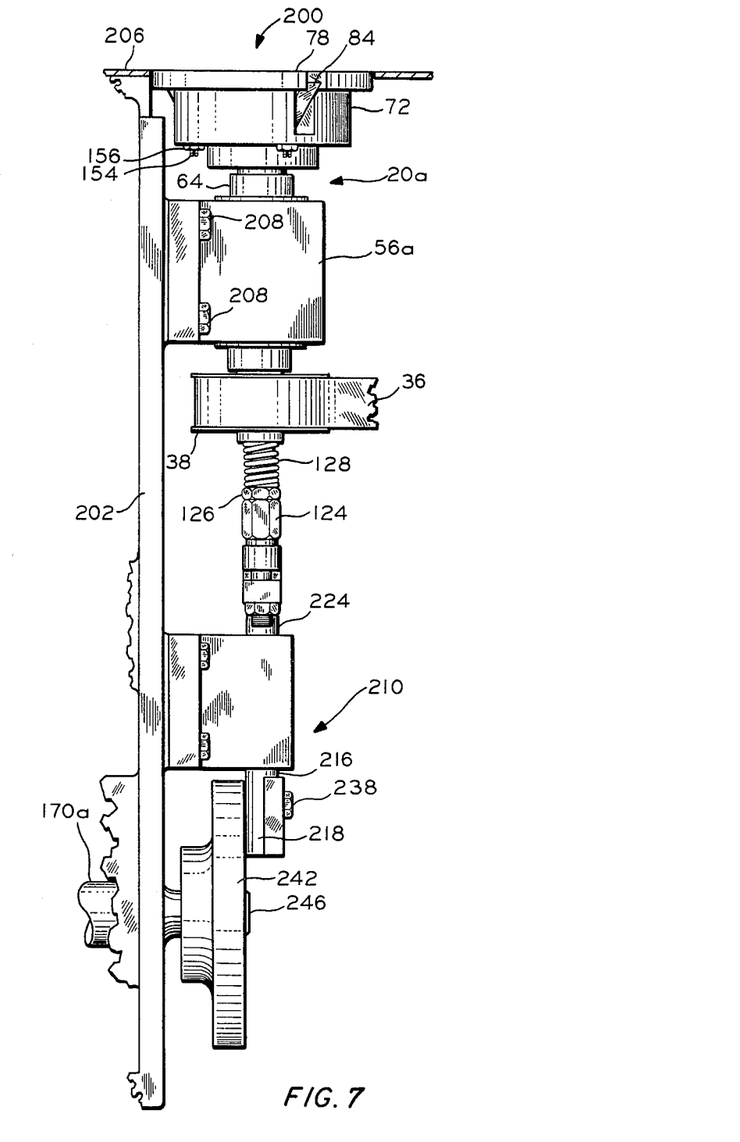
FIG. 7 is a partial side elevation view of the machine of FIG. 6 illustrating one of the container spinning stations with the container-engaging jaw members in the retracted position.
Figure 8:
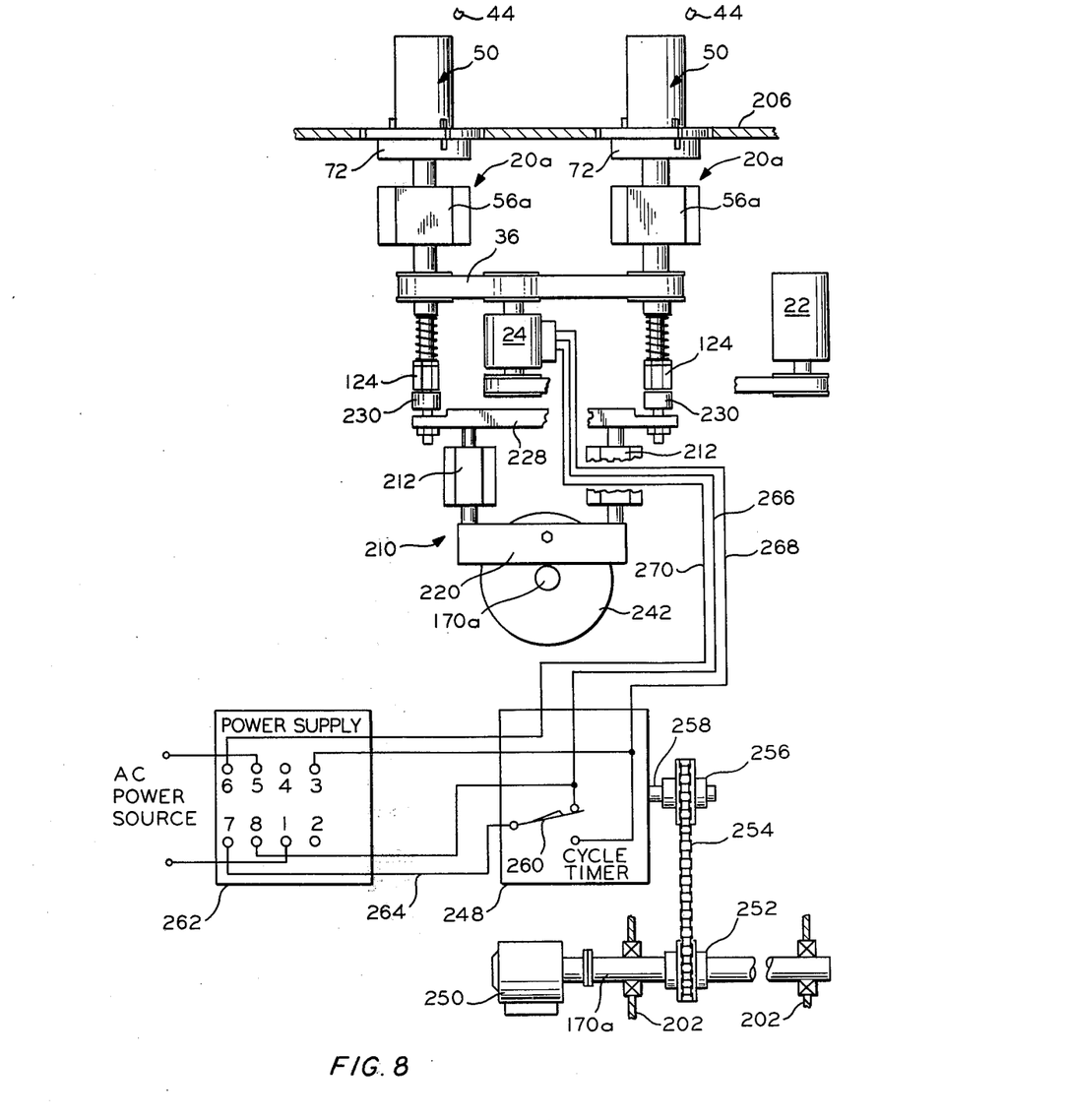
FIG. 8 is a schematic diagram of the control system for the container spinning stations of FIG. 6.

Referring now to FIGS. 6-8, there is disclosed an alternate form of paperboard container manufacturing machine, constructed in accordance with the present invention, which is generally designated by the reference character 200. The machine 200 comprises a support frame 202 comprising a vertical end plate 204 and a substantially horizontal container-supporting table 206.

The machine 200 further includes a pair of container spinning station assemblies 20a which are generally identical to the spinning station assemblies 20 described in detail above with the exception of a slightly modified bearing block 56a. The bearing block 56a differs from the previously described bearing block 56 only in that it has been adapted to be bolted by means of threaded bolts 208 to the end plate 204 to rotatably support the spinning station assemblies 20a beneath the container-supporting table 206. All other elements of the spinning station assembly 20a are identical to those previously described and are, therefore, identified by the same reference characters used previously.

The machine 200 differs primary from the previously described machine 10 in the manner in which the jaw-positioning shaft 102 is actuated upwardly and, alternately, permitted to move downwardly to respectively retract and extend the jaw members 84. More particularly, machine 200 employs a cam-operated yoke mechanism 210 to impart vertical reciprocating motion to the jaw-positioning shaft 102 of each of the spinning station assemblies 20a.

The mechanism 210 comprises a pair of bushing blocks 212 fixedly secured, as by threaded bolts 214, to the end plate 204. Each bushing block 212 carries a vertically oriented, cylindrical bushing therein. The cylindrical bushings are positioned in mutually parallel alignment. A pair of cylindrical shafts 216 are slidingly received in the respective bushings of the bushing blocks 212. The lower end portions 218 of the shafts 216 are rigidly interconnected by means of a transverse plate 220 which is fixedly secured at each end thereof to a respective shaft 216 by suitable means, such as threaded bolts 222. The upper end portions 224 of the shafts 216 are each fixedly secured by suitable means, such as threaded bolt 226, to a transverse bar 228 which extends a distance beyond each of the shafts 216 to positions vertically aligned with the rotational axes of the spinning station assemblies 20a. A vertically adjustable tappet 230 is threadedly engaged in an internally threaded aperture at each end portion of the bar 228. The tappets 230 are coaxially aligned with the rotational axes of the respective spinning station assemblies 20a. Each tappet 230 is provided with a substantially flat upper end face 232 for abuttingly engaging the lower end face 148 of the adjusting nut 124 of the respective spinning station assembly 20a. The tappets 230 are each provided with a jam nut 234 to provide means for locking the respective tappet in the desired position relative to the bar 228.

A roller cam follower 236 is secured to the medial portion of the plate 220 by means of a threaded bolt 238. The cam follower 236 is received within an endless cam slot 240 formed in a cam plate 242, which cam plate is drivingly secured by means of a key 244 to the outer end portion 246 of a slightly modified main shaft 170a extending through the end plate 204 of the machine 200. Rotation of the cam plate 242 by the shaft 170a imparts vertical reciprocation to the yoke mechanism 210 through the cam follower 236. In a preferred embodiment, the yoke 210 is subjected to vertical reciprocation of about 0.5 inch (1.27 cm). The yoke 210 is preferably maintained at the lower limit of reciprocation through a rotational angle of the cam plate 242 of about 110° and is preferably maintained at its upper limit of reciprocation through a rotational angle of the cam plate 242 of about 160°. The rotational angles of the cam plate 242 from the uppermost position to the lowermost position and from the lowermost position to the uppermost position of the yoke mechanism are each preferably about 45°. When the yoke mechanism 210 is in the lowermost postion, the tappets 230 are preferably adjusted in the transverse part 228 so as to provide a clearance between the upper end faces 232 thereof and the corresponding lower end faces 148 of the adjusting nut 124 of about 0.125 inch (3.2 mm).

A cycle timer 248 is mounted on the support frame 202 and provides means for controlling the sequence of the commencement and cessation of rotation of the spinning station assemblies 20a. The cycle timer 248 is preferably driven by the main shaft 170a of the machine 200, which shaft is journaled on the support frame 202 and is driven by the primary machine drive motor 250. A drive sprocket 252 drivingly secured to the shaft 170a is connected by a suitable drive chain 254 to a driven sprocket 256 which is drivingly secured to the power input shaft 258 of the cycle timer 248, as schematically illustrated in FIG. 8. The cycle timer 248 is preferably in the form of a rotating cam limit switch device comprising a cam-operated switch 260 actuated by a cam driven by the power input shaft 258.

A brake clutch power supply 262, substantially as described above in the description of the power supply 186, provides a suitable DC voltage output from a suitable AC power source input to the cam-operated switch 260 via conduit 264. The cam-operated switch 260 alternately provides this DC voltage to the brake input of the brake clutch 24 via conduit 266 and to the clutch input of the brake clutch 24 via conduit 268. Conduit 270 provides an electrical return path to the power supply 262 via the cycle timer 248. The cycle timer 248 provides sufficient time in each operating cycle with the clutch of the brake clutch 24 activated to assure that each rotary table rotates at least 360°.

The brake clutch 24 is substantially identical to the brake clutch described above. A suitable power supply for use as the brake clutch power supply 262 is available from Warner Electric Company, Beloit, Wisconsin, and is designated by the Model No. MCS-801. A suitable rotating cam limit switch for use as the cycle timer 248 is available from Gemco Electric Company, Clauson, Mich., and is designated by the general Model No. 1980.

Changes can be made in the construction, combination, and arrangement of parts or elements of the invention as heretofore set forth in the specification and shown in the drawings without departing from the spirit and scope of the invention as defined in the following claims.

That which is claimed is:

1. Apparatus for clamping and rotating containers comprising:

a support;

table means rotatably positioned on said support for supporting a container for rotation about an axis of rotation intersecting said container;

means on said support for mounting said table means on said support whereby said table means is free to rotate about said axis of rotation;

drive means operatively connected to said table means for rotating said table means about said axis of rotation;

a plurality of jaw means each movably mounted on said table means for moving between a first position wherein said jaw means are retracted out of engagement with a container, and a second position wherein said jaw means are actuated into engagement with a container;

jaw-positioning means engageable with said plurality of jaw means and adapted for reciprocal movement coaxial with said axis of rotation of said table means for positioning said plurality of jaw means in the first positions thereof in a first position of said jaw-positioning means and, alternatively, for positioning said plurality of jaw means in the second positions thereof in a second position of said jaw-positioning means; and actuator means operatively related to said jaw-positioning means for actuating said jaw-positioning mens into said first position thereof and, alternately, actuating said jaw-positioning means into said second position thereof.

2. Apparatus in accordance with claim 1 characterized further to include:

control means operatively connected to said drive means and to said actuator means for automatically causing said drive means to rotate said table means a predetermined amount when said jaw-positioning means is in the second position thereof, for automatically causing said drive means to cease rotating said table means after said predetermined amount of rotation thereof, and for automatically causing said actuator means to actuate said jaw-positioning means to the first position thereof after said drive means ceases rotating.

3. Apparatus in accordance with claim 1 or claim 2 wherein said actuator means comprises:

bias means for normally yieldably urging said jaw-positioning means into one position thereof; and means for overcoming the urging of said bias means for normally yieldably urging said jaw-positioning means so as to move said jaw-positioning means into the other position thereof.

4. Apparatus in accordance with claim 1 or claim 2 wherein said actuator means comprises:

bias means for normally urging said jaw-positioning means into the second position thereof; and power cylinder means for overcoming the urging of said bias means so as to move said jaw-positioning means into the first position thereof.

5. Apparatus in accordance with claim 1 or claim 2 wherein said actuator means comprises:

bias means for normally urging said jaw-positioning means into the second position thereof;

cam means journaled on said support for rotation;

means operatively connected to said cam means for rotating said cam means;

cam follower means operatively related to said cam means for translating rotation of said cam means into reciprocating motion of said cam follower means; and means interposed between said cam follower means and saw jaw-positioning means for transmitting reciprocating motion from said cam follower means to said jaw-positioning means so as to overcome the urging of said bias means to thereby move said jaw-positioning means into the first position thereof, and, alternately, to permit movement of said jaw-positioning means in response to the urging of said bias means from the first position of said jaw-positioning means to the second position thereof.

6. Apparatus in accordance with claim 1 wherein:

each of said jaw means comprises an L-shaped jaw member having a generally upwardly extending leg portion and a generally radially inwardly extending leg portion, said generally upwardly extending leg portion having generally radially inwardly directed container-engaging face means thereon for contacting the outer surface of a container being engaged thereby;

each said jaw member being pivotally secured to said table means with the generally radially inwardly extending leg portion thereof extending toward the rotational axis of said table means;

said jaw-positioning means comprises a shaft having first and second end portions and is mounted coaxially with the rotational axis of said table means, said shaft being adapted to move longitudinally along said rotational axis, said shaft icluding jaw cam means secured to the first end portion thereof and engageable with the generally radially inwardly extending leg portion of each of said jaw means for imparting pivotal motion to said jaw means in response to longitudinal movement of said shaft; and said actuator means comprises bias means operatively engaging the second end portion of said shaft for yieldably urging said jaw-positioning means into the second position thereof in response to bias action of said biasing means on said shaft.

7. An apparatus in accordance with claim 6 wherein said actuator means is characterized further to include:

power cylinder means adapted to operatively engage the second end portion of said shaft for overcoming the urging of said bias means so as to move said jaw-positioning means into the second position thereof via longitudinal movement of said shaft.

8. Apparatus in accordance with claim 6 wherein said actuator means is characterized further to include:

cam means journaled on said support for rotation;

means operatively connected to said cam means for rotating said cam means;

cam follower means operatively related to said cam means for translating motion of said cam means to reciprocal motion of said cam follower means;

means interposed between said cam follower means and the second end portion of said shaft means for transmitting reciprocating motion to said jaw-positioning means so as to alternately overcome the urging of said bias means to move said jaw-positioning means from the second position into the first position thereof and permit movement of said jaw-positioning means in response to the urging of said bias means from the first position into the second position thereof.

9. Apparatus in accordance with claim 7 or claim 8 characterized further to include: control means operatively related to said drive means and to said actuator means for automatically causing said drive means to rotate said table means through at least 360° of rotation when said jaw-positioning means is in the second position thereof, and for automatically causing said drive means to cease rotating said table means after said at least 360° of rotation thereof.

10. Apparatus in accordance with claim 6 wherein:

said table means is characterized further to include substantially flat surface means aligned perpendicular to the rotational axis of said table means for receiving a container thereon for rotation therewith;

each of said jaw members being fully retracted to a position below said flat surface means when in the first position of said jaw means; and said container engaging face means of each of said generally upwardly extending leg portions of each of said jaw members being extended above said flat surface means in the second position of said jaw means.

11. Apparatus in accordance with claim 9 wherein:

said table means is characterized further to include substantially flat surface means aligned perpendicular to the rotational axis of said table means for receiving a container thereon for rotation therewith, said container comprising a side wall and a bottom closure member each having an inner surface, and characterized by a juncture defined by the inner surfaces of the side wall and the bottom closure;

each of said jaw members being fully retracted to a position below said flat surface means when in the first position of said jaw means;

said container engaging face means of each of said generally upwardly extending leg portions of each of said jaw members being extended above said flat surface means in the second position of said jaw means; and said apparatus is characterized further to include means for dispensing a stream of sealant on the juncture between the inner surfaces of the bottom closure member and the side wall of the container during rotation thereof so as to apply a continuous coating of sealant along the full length of said juncture.

12. A method of applying sealant to the inside of a container at the juncture between the inner surfaces of the bottom closure member and the side wall thereof, comprising:

(a) positioning the container on a table adapted for rotation about an axis of rotation intersecting said container;

(b) mechanically clamping the container on said table so that the container rotates with said table;

(c) rotating said table and the container clamped thereto about the axis of rotation;

(d) dispensing a stream of sealant on the juncture between the inner surfaces of the bottom closure member and the side wall of the container during rotation thereof so as to apply a continuous coating of sealant along the full length of said juncture;

(e) stopping the rotation of said table and the container after dispensing the stream of sealant; and (f) releasing the container from thus stopped table.

13. A method in accordance with claim 12 characterized further to include the additional step of:

(g) moving the container from the table.

14. A method in accordance with claim 13 wherein steps (a) through (g) inclusive are repeated with another container.

15. A method in accordance with claim 12 wherein said table and said container clamped thereto are rotated at a speed and for a period of time sufficient to smooth the sealant along the full length of said juncture.

16. A method of applying sealant to the juncture between the inner surface of the bottom closure member and the inner surface of the side wall of a container, comprising:

(a) positioning the container on a table adapted for rotation about an axis of rotation intersecting said container;

(b) engaging the container with a plurality of jaws to secure the container on said table whereby the container is constrained to rotate with said table about the axis of rotation;

(c) rotating said table and the container secured thereto about the axis of rotation through a rotational angle of at least 360°;

(d) dispensing a stream of sealant of sealant on the juncture between the inner surface of the bottom closure member and the inner surface of the side wall of the container during the rotation of said table and the container through a rotational angle of at least 360° so as to apply a continuous coating of said sealant along the full length of the juncture between the inner surface of the bottom closure member and the inner surface of the side wall of the container;

(e) stopping the rotation of said table and the container secured thereto after dispensing of the stream of sealant;

(f) disengaging the plurality of jaws from the container after the rotation of said table and the container secured thereto has stopped so as to release the container from said table; and (g) moving the container from said table.

17. A method in accordance with claim 16 wherein steps (a) through (g) inclusive are automatically repeated with a succession of said containers.

18. A method in accordance with claim 16 or claim 17 wherein said table and the container secured thereto at a speed and for a period of time after the dispensing of the stream of sealant sufficient to smooth the sealant along the full length of the juncture between the inner surface of the bottom closure member and the inner surface of the side wall of the container.

19. A method in accordance with claim 18 wherein said table and the container secured thereto are rotated at a speed of about 1000 r.p.m.

* * * * *

UNITED STATES PATENT AND TRADEMARK OFFICE
CERTIFICATE OF CORRECTION

PATENT NO. : 4,295,903

DATED : October 20, 1981

INVENTOR(S) : Silvio T. Farfaglia

It is certified that error appears in the above—identified patent and that said Letters Patent is hereby corrected as shown below:

Claim 6, column 10, line 17, change "icluding" to --- including ---.

Claim 16, column 12, line 23, delete "of sealant", second occurrence.

Signed and Sealed this

Twenty-eighth Day of December 1982

[SEAL]

Attest:

GERALD J. MOSSINGHOFF

Attesting Officer     Commissioner of Patents and Trademarks